US012212202B2

(12) United States Patent
Romagnolo et al.

(10) Patent No.: US 12,212,202 B2
(45) Date of Patent: Jan. 28, 2025

(54) ROTARY ELECTRICAL MACHINE

(71) Applicant: Valeo Equipements Electriques Moteur, Creteil (FR)

(72) Inventors: Vincent Romagnolo, Créteil (FR); Christopher Riche, Créteil (FR); Ronald Malbranque, Créteil (FR)

(73) Assignee: Valeo Equipements Electriques Moteur, Creteil (FR)

( * ) Notice: Subject to any disclaimer, the term of this patent is extended or adjusted under 35 U.S.C. 154(b) by 757 days.

(21) Appl. No.: 17/263,394

(22) PCT Filed: Jul. 24, 2019

(86) PCT No.: PCT/EP2019/069864
§ 371 (c)(1),
(2) Date: Jan. 26, 2021

(87) PCT Pub. No.: WO2020/025405
PCT Pub. Date: Feb. 6, 2020

(65) Prior Publication Data
US 2021/0167656 A1 Jun. 3, 2021

(30) Foreign Application Priority Data
Jul. 30, 2018 (FR) ...................................... 1857082

(51) Int. Cl.
*H02K 3/28* (2006.01)
*H02K 3/38* (2006.01)
*H02K 3/50* (2006.01)

(52) U.S. Cl.
CPC .................. *H02K 3/28* (2013.01); *H02K 3/38* (2013.01); *H02K 3/50* (2013.01); *H02K 2203/09* (2013.01)

(58) Field of Classification Search
CPC ............... H02K 3/28; H02K 3/38; H02K 3/50
(Continued)

(56) References Cited

U.S. PATENT DOCUMENTS

2001/0026109 A1  10/2001  Higashino et al.
2011/0175471 A1*  7/2011  Marchitto .............. H02K 3/521
                                                                310/71
2015/0097453 A1   4/2015  Nishikawa et al.

FOREIGN PATENT DOCUMENTS

FR        3046505 A1 *  7/2017
JP     2001-286082 A   10/2001
(Continued)

OTHER PUBLICATIONS

Notification of Reason for Rejection issued in Japanese Patent Application No. 2021-505221, mailed on Apr. 22, 2022 (7 pages).
(Continued)

*Primary Examiner* — Jose A Gonzalez Quinones
(74) *Attorney, Agent, or Firm* — Osha Bergman Watanabe & Burton LLP

(57) ABSTRACT

The invention relates to a rotary electric machine, in particular for a motor vehicle, including: a stator (100) comprising a stator body (110) and an electrical coil, said electrical coil including a plurality of phase windings (120) forming a bundle (125) that protrudes from an axial end face of the stator body, each phase winding including an end forming a coil connection point (122); and at least one electrical connection member (150) positioned in continuation of the stator (100) and comprising at least one electrically conductive element (155) which is overmolded with an electrically insulating material (126) and extends radially out of the electrically insulating material to form at least two connection outputs (153, 154) to which the connection points are connected.

13 Claims, 6 Drawing Sheets

(58) Field of Classification Search
USPC .......................... 310/71, 184, 194, 198, 208
See application file for complete search history.

(56) References Cited

FOREIGN PATENT DOCUMENTS

| JP | 2015-076905 A | 4/2015 | |
|----|---|---|---|
| WO | WO-2013045986 A2 * | 4/2013 | ............... H02K 3/28 |
| WO | WO-2017026412 A1 * | 2/2017 | ......... H02K 15/0068 |
| WO | 2017/162568 A1 | 9/2017 | |

OTHER PUBLICATIONS

International Search Report and Written Opinion in corresponding International Application No. PCT/EP2019/069864, mailed Sep. 30, 2019 (12 pages).

* cited by examiner

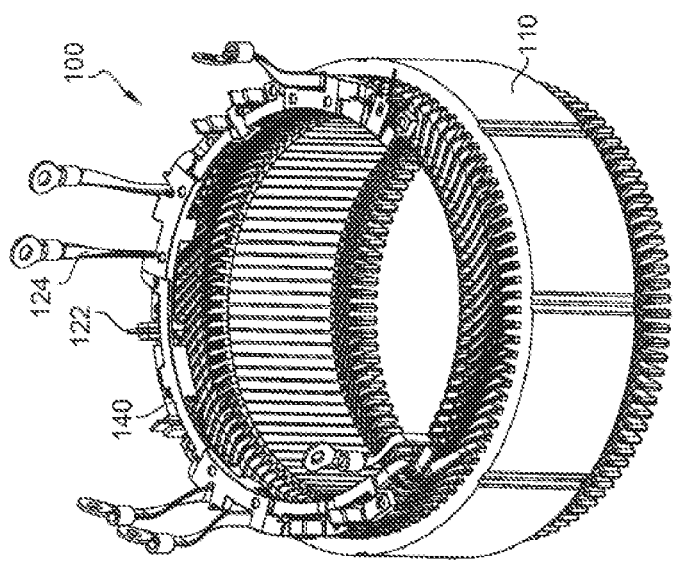
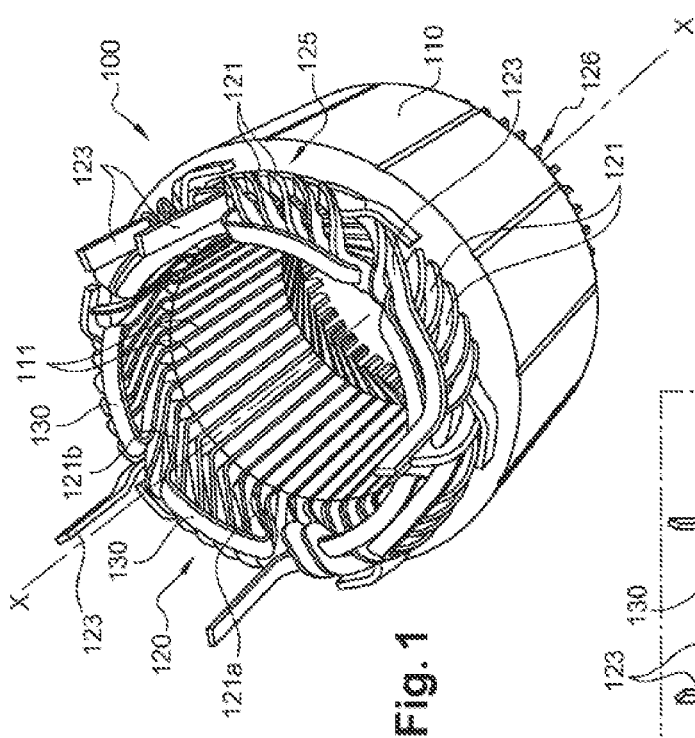
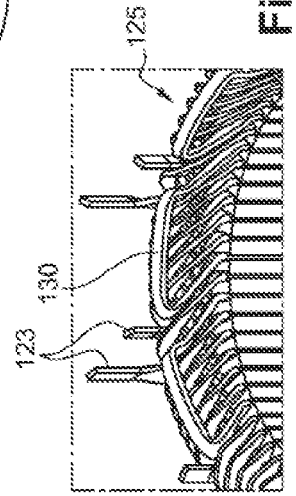
Fig. 1
Fig. 2
Fig. 3

ROTARY ELECTRICAL MACHINE

TECHNICAL FIELD

The invention relates to a rotary electrical machine, in particular for a motor vehicle, wherein putting into place of the interconnector is simplified.

The invention has applications in the field of rotary electrical machines such as alternators or reversible machines which can operate as an electric generator or an electric motor.

PRIOR ART

In a known manner, rotary electrical machines comprise a stator and a rotor which is integral with a shaft. The rotor can be integral with a driving and/or driven shaft, and can belong to a rotary electrical machine in the form of an alternator, an electric motor, or a reversible machine of the alternator-starter type, which can operate in both modes.

The stator is fitted in a housing which is configured to rotate the shaft on bearings by means of roller bearings. The rotor is of the "rotor with claws" type, and comprises two magnet wheels which each have claws imbricated in one another in order to form the poles, and a core around which a rotor coil is wound. According to another example, the rotor comprises a body formed by a stack of metal plate sheets which are retained in the form of a set by means of an apstandriate securing system. The rotor comprises poles which are formed for example by permanent magnets accommodated in cavities provided in the magnetic mass of the rotor. Alternatively, in a so-called "projecting" poles architecture, the poles are formed by coils wound around arms of the rotor.

As represented in FIGS. 1, 2 and 3, the stator 100 comprises a body 110 constituted by a stack of thin metal plates forming a crown, the inner face of which is provided with notches 111 which are radially open towards the interior in order to receive phase windings 120. These phase windings 120 pass through the notches 111 in the stator body 110 and form a coil end 125, 126 on both sides of the stator body 110. The phase windings 120 are polyphase windings, connected in the form of a star or a triangle, the phase input/outputs 123 of which are connected to an electrical control module.

The phase windings 120 are obtained from conductive elements in the form of pins 121. A pin 121 has two branches which are connected by a curved head, or collateral portion, and the intermediate straight portions, or central portions of which, are placed in two different notches which are offset from one another angularly by a predetermined angle. The heads of the pins 121 are twisted and form the upper coil end 125, i.e. the coil end which is provided with the phase inputs/outputs, situated upstream from the winding. The free ends of the branches are connected to one another for example by welding, and are twisted in order to form the lower coil end 126, i.e. the coil end downstream from the winding.

The pins 121 are connected to one another electrically. Two pins 121 of a single winding are connected to one another directly, for example by welding, Two phase windings 120 are connected to one another by means of inversion pins 130, with each inversion pin connecting the final pin 121a of one of the windings electrically to the first pin 121b of the other winding, in general, the inversion pins 130 are located above the upper coil end, i.e. in the axial extension of the winding, such as to connect to one another two windings having respectively a first and a second pin which are positioned spaced from one another.

Each phase winding 120 comprises a phase output 124 and a connection point 122. When the phase windings are connected in the form of a star, the connection point is a neutral point. When the phase windings are connected in the form of a triangle, the connection point is a point which makes it possible to connect two distinct windings in order to form the triangle connection. The winding of the stator thus comprises a plurality of connection points 122, and a plurality of phase outputs 124 distributed along a periphery of the stator 100. The connection points 122 of a single phase system must be connected together without creating an electrical short circuit with the phase outputs 124, in order to guarantee a good electrical supply to the winding of the stator. For this purpose, the stator 100 generally comprises an electrical connection unit 140, which connects the connection points 122 electrically to one another whilst avoiding the phase outputs 124. A connection unit of this type generally has a complex form, and consequently a substantial size.

In the example of a stator represented in FIG. 3, the connection unit connects the neutral points 122 electrically to one another and goes around the phase outputs 124. However, because of the complex form of this connection unit and the need to keep it spaced from the phase outputs, production of the stator requires precise putting into place of the connection unit above the coil end, and retention of the said unit in position throughout the duration of the process of welding of the neutral points 122, which makes the production process difficult and problematic.

SUMMARY OF THE INVENTION

In order to respond to the above-described problems relating to the difficulties of production of the stators and of size of the connection units, the applicant is standosing a rotary electrical machine wherein the connection unit is partly over-moulded in an electrically insulating material.

According to a first aspect, the invention relates to a rotary electrical machine, in particular for a motor vehicle, comprising:

a stator comprising a stator body and an electrical winding, the said electrical winding comprising a plurality of phase windings forming a coil end projecting from an axial end face of the stator body, each phase winding comprising an end forming a winding connection point; and at least one electrical connection unit which is positioned in the extension of the stator, and comprises at least one electrically conductive element over-moulded in an electrically insulating material, and extending radially from the electrically insulating material, in order to form at least two connection outputs to which the connection points are connected.

A rotary electrical machine of this type has a size which is reduced in comparison with the machines according to the prior art.

According to one embodiment, the connection points are neutral points of the winding.

According to one embodiment, the electrical winding is a winding of the wave type. The said winding can for example be of the simple wave or distributed wave, or also simple wave type. A wave winding of this type is different from a winding of the concentric type, in that a single coil of a phase winding of a wave winding is inserted in a plurality of notches, such as to be wound around a plurality of teeth, and a coil of a phase winding of a winding of the concentric type for its part is wound around a single tooth.

According to one embodiment, the electrical winding comprises a plurality of electrical conductors which are connected to one another such as to form the plurality of phase windings. For example, each of the electrical conductors has the form of a "U" or an "I". Reference is then made to a winding with conductive pins.

Advantageously, the connection unit is positioned at the top of the coil end.

According to some embodiments, the connection unit is supported on the coil end. These embodiments make it possible to limit the vibrations within the machine when it is rotating.

In some embodiments, in which the electrical winding comprises a plurality of electrical conductors connected to one another such as to form the plurality of phase windings, and inversion pins each connecting two distinct electrical conductors electrically, the connection unit is supported on at least one of the inversion pins.

These embodiments permit facilitated putting into place of the connection unit during the production of the machine.

The rotary electrical machine according to the invention can comprise one or a plurality of the following characteristics:

- the electrically insulating material forms a stability stand at one end of the connection unit at least.
- a contact area formed by a contact between the connection output of the connection unit and the connection point of the associated winding extends on a plane parallel to the axis of the stator, and in particular on a plane comprising the said axis.
- the connection output of the connection unit and the connection point of the associated winding are arranged such as to be in contact with one another in a circumferential direction, and in particular only in the said circumferential direction.
- the connection outputs each comprise at least one connection area extending axially along a connection point and to which the said connection point is connected.
- the connection outputs each comprise at least one connection area extending radially along a connection point, and to which the said connection point is connected.
- the connection unit comprises a plurality of electrically conductive elements which are over-moulded in a single electrically insulating material, with ends of the electrically conductive elements forming a connection output.
- two connection outputs of two adjacent electrically conductive elements are connected to a single connection point. For example, the connection point is arranged between the two connection outputs in a circumferential direction.
- at least the connection outputs which are situated at the ends of the connection are each provided with a paillon ensuring the contact with the connection point.
- each connection point is welded on at least one connection output by means of laser welding or electrical welding.
- it comprises at least two connection units distributed on the circumference of the winding coil end.

According to a second aspect, the invention relates to a rotary electrical machine, in particular for a motor vehicle, comprising:

- a stator comprising a stator body and an electrical winding, the said electrical winding comprising a plurality of phase windings forming a coil end projecting on an axial end face of the stator body, each phase winding comprising an end forming a winding connection point; and
- a plurality of electrically conductive elements each comprising at least one end extending radially in order to form connection outputs to which the connection points are connected, the said electrically conductive elements being connected to one another by over-moulding in order to form an electrical connection unit.

Advantageously, the machine comprises at least two connection units distributed on the circumference of the winding coil end.

BRIEF DESCRIPTION OF THE FIGURES

Other advantages and characteristics of the invention will become apparent from reading the description, illustrated by the figures, in which:

FIGS. 1 and 2, already described, represent a view in perspective and a partial view of a stator winding according to the prior art;

FIG. 3, already described, represents a view in perspective of a stator equipped with a connection unit according to the prior art;

DETAILED DESCRIPTION OF AT LEAST ONE EMBODIMENT

Figure 4A:
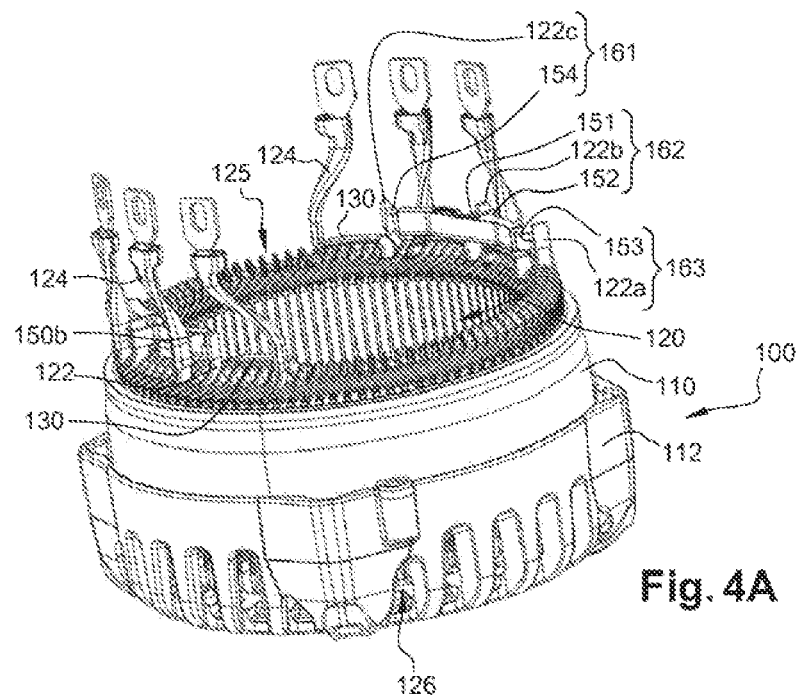
FIGS. 4A, 4B and 4C represent respectively a partial view in perspective, a view from above and a partial front view of a rotary electrical machine according to an embodiment of the invention.

Embodiments of a rotary electrical machine in which the connection unit is partly over-moulded in an electrically insulating material is described in detail hereinafter with reference to the appended drawings. These examples illustrate the characteristics and advantages of the invention. It should however be remembered that the invention is not limited to these examples.

In the figures, elements which are identical have identical reference numbers. For reasons of legibility of the figures, the scales of size between elements represented are not respected.

FIGS. 4 to 9 represent different partial views of a rotary electrical machine according to a plurality of embodiments of the invention. Irrespective of the embodiment concerned, the rotary electrical machine comprises a stator 100 with an axis X comprising a stator body 110 through which one of the phase windings 120 forming the winding of the stator passes. As previously explained, the phase windings 120 form a coil end at each end of the stator body 110, A connection unit 150 is fitted in the extension of at least one of the coil ends 125, 126. In the different examples represented in FIGS. 4 to 9, the connection unit 150 is fitted in the extension of the upper coil end 125, on the understanding that it could similarly be fitted in the extension of the lower coil end 126.

In the examples in FIGS. 4 to 9, only the upper coil end 125 can be seen, with the housing 112 of the stator surrounding the lower coil end 126. For reasons of limitation of the size, the connection unit 150 is preferably positioned in the axial extension of the coil end, on the understanding that offset positionings can be envisaged for advantages other than that of the size.

The connection unit 150, which is also known as the interconnector, comprises one or a plurality of electrically conductive elements 155, which for example are made of copper, over-moulded in an electrically insulating material forming an insulating envelope 156. This interconnector 150 has a material which is electrically insulating and is resistant to the heat of the winding. It can be positioned supported on the coil end 125 of the stator, which makes it possible to limit the size generated by the presence of the interconnector, and to limit the vibrations generated by the electrical machine during rotation.

In some embodiments, the interconnector 150 is positioned supported on one or a plurality of inversion pins 130, which ensures stable positioning of the interconnector, in particular during operations of installation of the interconnector 150. In fact, during operations of production of the stator, putting into place of the interconnector is facilitated by its positioning on the inversion pins 130, and the welding of the neutral points on the interconnector is facilitated by the stability of the assembly. The use of tools in order to retain the interconnector in place is no longer necessary.

The interconnector 150 comprises a plurality of electrically conductive elements 155, also known as conductive tracks, which mostly extend in the interior of the insulating envelope 156, and which, outside the said insulating envelope, form connection outputs for the neutral points 122. An interconnector 150 with two electrically conductive elements 155 extending in the interior of the insulating envelope 156 is represented partly in FIG. 6C. This figure shows in greater detail ends of each of the conductive tracks 155 extending radially from the said insulating envelope 156, in order each to form a connection output 153, 157. Each conductive track end 153, 157, also known as the output connection, is connected to a neutral point 122. In fact, the phase windings 120 of the stator form a winding neutral point 122 at each of their ends, these neutral points being connected to one another by means of the interconnector 150.

For this purpose, each conductive track end 155 extends radially from the insulating envelope 156, forming an angle of approximately 90° with the insulating envelope 156. Each connection output 153, 157 thus forms a connection hook, which can be connected, for example by means of laser welding or electrical welding, to a neutral point 122. This radial extension of the connection hooks makes it possible to avoid any risk of damage to the insulating envelope during operations of welding of the neutral points.

Figure 6A:
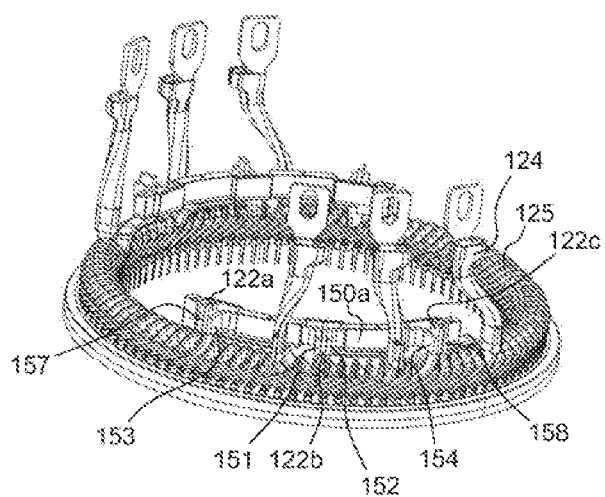
FIGS. 6A, 6B and 6C represent partial views in perspective and from the front of a rotary electrical machine according to another embodiment of the invention.
Figure 6B:
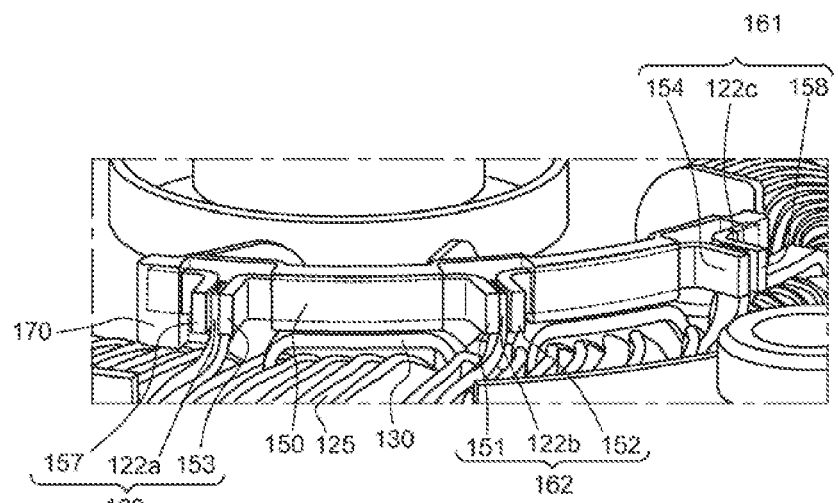
Figure 6C:
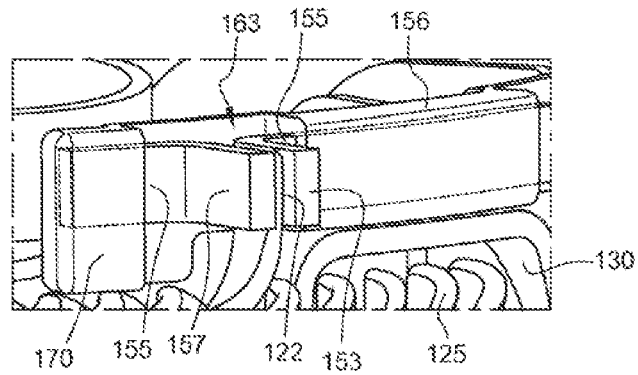

As represented in particular in FIG. 6C, a neutral point 122 can be connected between the ends of two adjacent conductive tracks. As shown in this example, the two ends of conductive tracks, for example the ends 153 and 157, are the ends of two adjacent conductive tracks 155, obtained from a single insulating envelope 156. These two ends 153, 157 extend substantially parallel from the insulating envelope 156 in order to form a double connection hook which is designed to sandwich a neutral point 122. A welding operation, for example electrical or laser, ensures the electrical connection between the neutral point 122 and each of the ends 153, 157.

A single interconnector 150, for example in the form of an arc of a circle, can connect all the neutral points 122 of the winding. A plurality of interconnectors, for example two, each in the form of an arc of a circle, can be distributed on the circumference of the coil end 125, with each interconnector connecting only some of the neutral points 122 of the winding. A distribution of this type of the interconnectors permits good ventilation within the rotary electrical machine. In the examples in FIGS. 4 to 9, two interconnectors 150a, 150b are positioned diametrically opposite one another on the circumference of the coil end 125, each connecting three neutral points.

Different modes of connection of the neutral points 122 to the interconnector 150a or 150b are represented in FIGS. 4 to 9. Persons skilled in the art will understand that, when a plurality of interconnectors are fitted in the machine, the connection mode of the neutral points 122 can be identical for each of the interconnectors, as represented in FIGS. 4 to 9, or, on the contrary, that the connection mode can differ from one interconnector to another. In the examples described hereinafter, it will be considered that the connection modes of the two interconnectors 150a, 150b are similar. The connection mode of a single interconnector will thus be described.

Each neutral point 122 of the stator winding can be connected to one or two ends of conductive tracks 155. In the example in FIGS. 4A-4C, the central neutral point 122b is connected between two ends of conductive tracks, and the two lateral neutral points 122a, 122c are each connected to a single end of a conductive track 155. For example, for the interconnector 150a, the lateral neutral point 122a is connected to an end 153 of a conductive track 155. Once they are welded to one another, the neutral point 122a and the end 153 of the conductive track form a connection point 163. Similarly, once they are connected, the lateral neutral point 122c and the end 154 of the conductive track form the connection point 161. The central neutral point 122b for its part is connected between the end 151 of a conductive track and the end 152 of another conductive track of the same interconnector 150a. Once they are welded to one another, the neutral point 122b and the ends 151, 152 of the conductive tracks form a connection point 162. In these embodiments, the lateral neutral points 122a, 122c are welded on the exterior of the interconnector, and close the interconnector 150a.

Figure 4B:
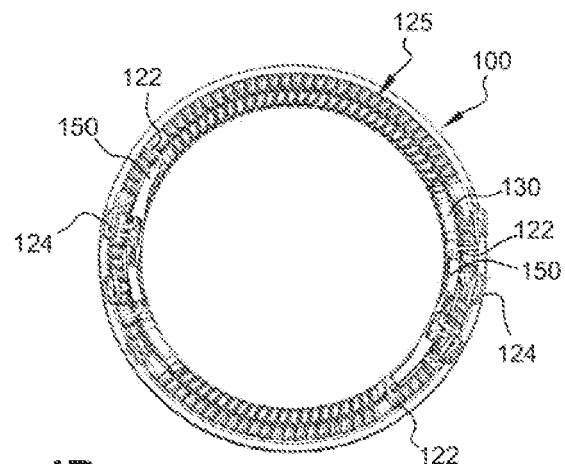
Figure 4C:
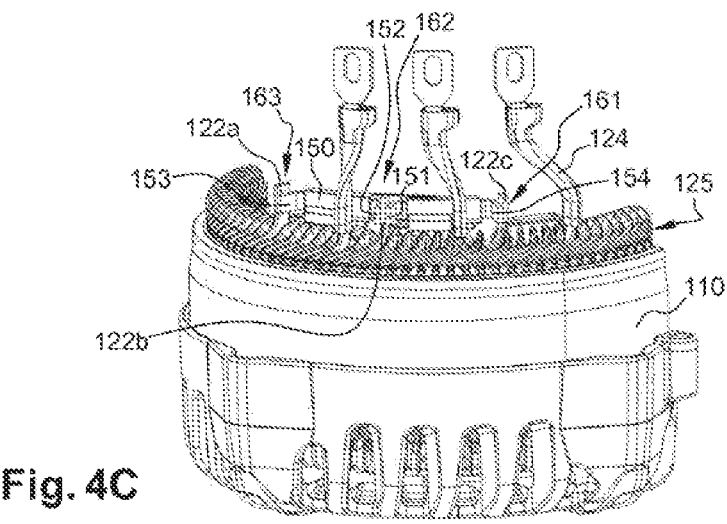
Figure 5:
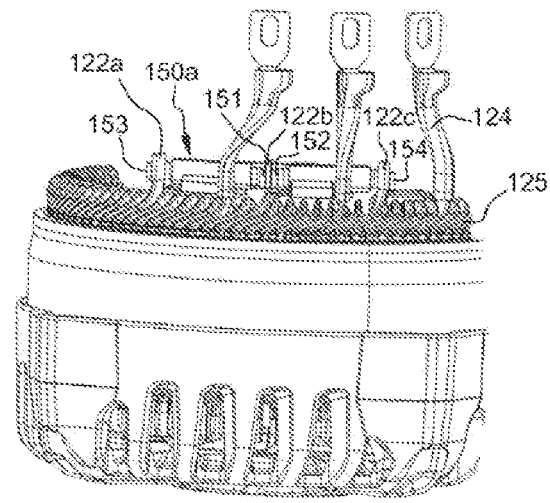
FIG. 5 represents a partial front view of a rotary electrical machine according to another embodiment of the invention.

In the example in FIG. 5, the central neutral point 122b is connected, as in FIGS. 4A-4C, between two ends 151, 152 of conductive tracks, and the two lateral neutral points 122a, 122c are each connected to a single end, respectively 153 and 154, of the conductive track 155, However, in this example, the lateral neutral points 122a, 122c are welded in the interior of the interconnector. It is therefore the ends 153, 154 which closed the interconnector 150a.

In the examples in FIGS. 6A, 6B, 6C, each neutral point 122a, 122b and 122c is connected between two ends of conductive tracks, respectively 153 and 157, 151 and 152, 154 and 158. In other words, each neutral point, whether it is central or lateral, is connected within a double hook. In these examples, in order to ensure the stability of the interconnector 150a, a stand 170 can be installed below the insulating envelope 156, such as to be supported on the coil end 125, As a variant, a stand can be provided at each of the ends of the interconnector 150a, with each stand having dimensions designed to prevent any pivoting of the interconnector. This stand 170 is a protuberance, made of insulating material, projecting between the conductive track 155 and the coil end 125, It can be added below the insulating envelope 156, or it can be formed by moulding in the electrically insulating material.

In embodiments not represented in the figures, where the interconnector 150 is not supported on the coil end, a central stand can be formed below the interconnector, for example facing the portion containing the connection point 162, in order to ensure the retention of the interconnector in the extension of the coil end.

In the embodiments in FIGS. 4A-4C, 5 and 6A-6C, each connection hook or double hook extends radially through the coil end 125. Reference is then made to a radial hook/double hook. In other words, each connection point 161, 162, 163 comprises a connection area, at the end of the conductive track, which extends in a direction perpendicular to the direction in which the neutral point 122 emerges from the winding. The welding, which ensures the electrical conduction between the neutral point and the interconnector, is thus provided at the point of intersection of the hook or double hook, and the neutral point.

Figure 7:
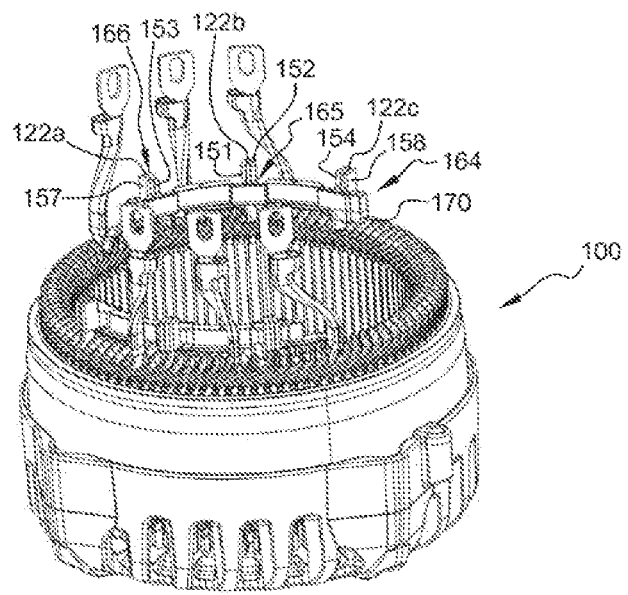
FIGS. 7, 8 and 9 represent partial views in perspective of a rotary electrical machine according to yet another embodiment of the invention.
Figure 8:
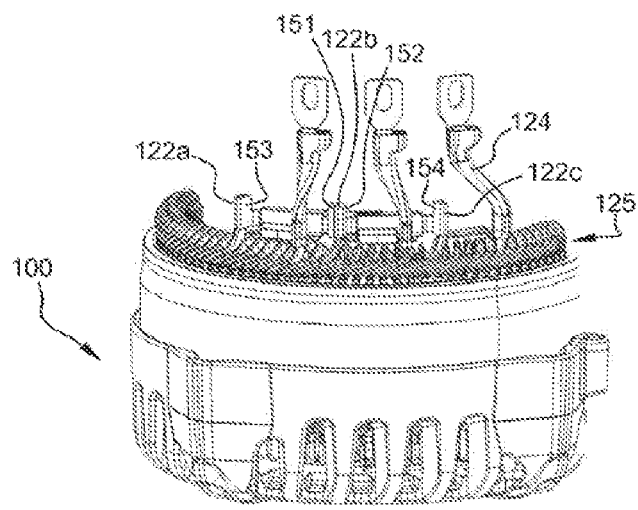
Figure 9:
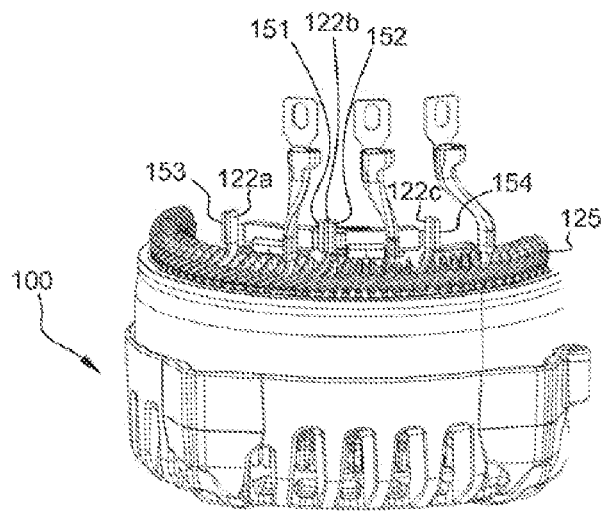

In the embodiments in FIGS. 7 to 9, each connection hook or double hook extends axially in the extension of the winding. Reference is then made to an axial hook/double hook. In other words, each connection point 164, 165, 166 comprises a connection area, at the end of the conductive track, which extends in a direction parallel to the direction in which the neutral point 122 emerges from the winding. The connection area and the neutral point are welded parallel to one another, which makes it possible to increase the area of electrical conduction between the two parts.

In the connection modes with axial hooks/double hooks, each neutral point 122 can be connected to a single end of a conductive track, or between two ends of conductive tracks. In the example in FIG. 7, each neutral point 122a, 122b and 122c is connected axially between two ends of conductive tracks, respectively 153 and 157, 151 and 152, 154 and 158. In other words, each neutral point, whether it is central or lateral, is connected within a double hook. In this example, a stand 170 is installed laterally, on both sides of the interconnector, below the insulating envelope 126, in order to ensure the stability of the said interconnector 150a.

In the examples in FIGS. 8 and 9, the central neutral point 122b is connected between two ends of conductive tracks, and the two lateral neutral points 122a, 122c are each connected to a single end of a conductive track 155. For example, the lateral neutral point 122a is connected to an end 153 of a conductive track 155 which, after welding, forms the connection point 166. Symmetrically, the lateral neutral point 122c is connected to an end 154 of a conductive track 155 which, after welding, forms the connection point 164. The central neutral point 122b, for its part, is connected between the end 151 of a conductive track and the end 152 of another conductive track of the same interconnector 150a which, after welding, forms the connection point 165.

In the example in FIG. 8 in particular, the lateral neutral points 122a, 122c are welded on the exterior of the interconnector 150a, such that they close the interconnector. Alternatively, in the example in FIG. 9, the lateral neutral points 122a, 122c are welded in the interior of the connector 150a, such that it is the ends 153, 154 which close the interconnector.

In the embodiments where the lateral neutral points are connected to a simple connection hook, i.e. to a single conductive track end, the connection hook is previously provided with a tin paillon in order to ensure a high-quality weld between the neutral point and the connection hook.

Irrespective of the embodiments, the three neutral points 122a, 122b, 122c of a stator winding, are connected to one another by means of the interconnector 150. This interconnector 150 could also connect the phase outputs 124 of the stator, such as to bring all the phase inputs and outputs circumferentially towards an electronic control.

The foregoing description focuses on a winding which is connected in the form of a star. It will be appreciated that a departure from the context of the invention will not be constituted by replacing the coupling in the form of a star by a coupling in the form of a triangle, with the neutral points then being replaced by connection points making it possible to connect the phase windings to one another in order to form the triangle connections.

Although described by means of a certain number of examples, variants and embodiments, the rotary electrical machine according to the invention comprises different variants, modifications and improvements which will become apparent to persons skilled in the art, on the understanding that these variants, modifications and improvements form part of the scope of the invention as defined by the following claims. For example, a departure from the context of the invention will not be constituted by replacing the plurality of electrical conductors welded to one another which form the winding by continuous wires with a round or rectangular cross-section.

The invention claimed is:

1. A rotary electrical machine for a motor vehicle, comprising:
   a stator comprising a stator body and an electrical winding,
      wherein the electrical winding comprises a plurality of phase windings forming a coil end projecting from an axial end face of the stator body;
      wherein each phase winding comprises a first end forming a winding connection point and a second end forming a phase output, and
      wherein the phase outputs and the winding connection points of the phase windings are positioned between a first radius and a second radius from an axis of the stator body, the second radius being smaller than the first radius; and
   at least one electrical connection unit, positioned in an extension of the stator, comprising at least one electrically conductive element over-moulded in an electrically insulating material,
      wherein the at least one electrically conductive element comprises a circular portion between the second radius and a third radius from the axis of the stator body, the third radius being smaller than the second radius, and
      wherein the at least one electrically conductive element extends radially from the circular portion and the electrically insulating material to form at least two connection outputs to which winding connection points are connected.

2. The rotary electrical machine according to claim 1, wherein the connection unit is positioned at the top of the coil end.

3. The rotary electrical machine according to claim 2, wherein the connection unit is supported on the coil end.

4. The rotary electrical machine according to claim 2, wherein the electrical winding comprises a plurality of electrical conductors connected to one another such as to form the plurality of phase windings, and inversion pins each connecting two distinct electrical conductors electrically, characterised in that the connection unit is supported on at least one of the inversion pins.

5. The rotary electrical machine according to claim 3, wherein the electrically insulating material forms a stability stand at one end of the connection unit at least.

6. The rotary electrical machine according to claim 1, wherein a contact area formed by a contact between the connection output of the connection unit and the connection point of the associated winding extends on a plane parallel to the axis of the stator, and on a plane comprising the axis.

7. The rotary electrical machine according to claim 1, wherein the connection output of the connection unit and the connection point of the associated winding are arranged such as to be in contact with one another in a circumferential direction, and only in the circumferential direction.

8. The rotary electrical machine according to claim 1, wherein the connection outputs each comprise at least one connection area extending axially along a connection point and to which the connection point is connected.

9. The rotary electrical machine according to claim 1, wherein the connection outputs each comprise at least one connection area extending radially along a connection point, and to which the connection point is connected.

10. The rotary electrical machine according to claim 1, wherein the connection unit comprises a plurality of electrically conductive elements which are over-moulded in a single electrically insulating material, with ends of the electrically conductive elements forming connection outputs.

11. The rotary electrical machine according to claim 10, wherein two connection outputs of two adjacent electrically conductive elements are connected to a single connection point.

12. The rotary electrical machine according to claim 1, wherein at least the connection outputs which are situated at the ends of the connection unit are each provided with a paillon ensuring the contact with the connection point.

13. The rotary electrical machine according to claim 1, wherein the electrical winding is a winding of the wave type.

\* \* \* \* \*